US012403492B2

(12) United States Patent
Lee

(10) Patent No.: US 12,403,492 B2
(45) Date of Patent: Sep. 2, 2025

(54) PUMP CAP

(71) Applicant: SAMHWA CO., LTD, Uiwang-si (KR)

(72) Inventor: Kyung Chang Lee, Uiwang-si (KR)

(73) Assignee: SAMHWA CO., LTD, Uiwang-si (KR)

( * ) Notice: Subject to any disclaimer, the term of this patent is extended or adjusted under 35 U.S.C. 154(b) by 178 days.

(21) Appl. No.: 17/913,152

(22) PCT Filed: Nov. 13, 2020

(86) PCT No.: PCT/KR2020/015949
§ 371 (c)(1),
(2) Date: Sep. 20, 2022

(87) PCT Pub. No.: WO2021/206252
PCT Pub. Date: Oct. 14, 2021

(65) Prior Publication Data

US 2023/0173518 A1 Jun. 8, 2023

(30) Foreign Application Priority Data

Apr. 7, 2020 (KR) ........................ 10-2020-0042160

(51) Int. Cl.
*B05B 11/10* (2023.01)

(52) U.S. Cl.
CPC ...... *B05B 11/1074* (2023.01); *B05B 11/1023* (2023.01); *B05B 11/1047* (2023.01); *B05B 11/1077* (2023.01)

(58) Field of Classification Search
CPC ............. B05B 11/1074; B05B 11/1047; B05B 11/1077; B05B 11/1023
See application file for complete search history.

(56) References Cited

U.S. PATENT DOCUMENTS 4,732,549 A * 3/1988 von Schuckmann ........................ B05B 11/1035 222/207
5,014,881 A * 5/1991 Andris ................ B05B 11/1035 222/207

(Continued)

FOREIGN PATENT DOCUMENTS

KR 20-2012-0004976 U 7/2012
KR 10-1963619 B1 3/2019

(Continued)

OTHER PUBLICATIONS

International Search Report in International Application No. PCT/KR2020/015949, dated Feb. 2, 2021, 3 pages.

*Primary Examiner* — Paul R Durand
*Assistant Examiner* — Randall A Gruby
(74) *Attorney, Agent, or Firm* — Park, Kim & Suh, LLC

(57) ABSTRACT

One aspect of the invention provides a pump cap that includes: a cylinder having an interior space into which a content may be drawn; a piston configured to move up and down within the interior space and having an inflow hole formed therein that connects to the interior space; a valve configured to move together with the upward and downward movement of the piston, while maintaining contact with an inner perimeter of the cylinder and an outer perimeter of the piston, so as to be capable of closing the inflow hole; a rod that is coupled to an upper portion of the piston, has an inside connecting with the inside of the piston, and protrudes to the outside of the cylinder; a shoulder coupled to an upper portion of the cylinder; and an elastic member that has one end contacting the shoulder and another end contacting the rod and is configured to provide an elastic force for pushing the rod upward, where the elastic member may include a deformable flexible portion.

4 Claims, 5 Drawing Sheets

(56) References Cited

U.S. PATENT DOCUMENTS

| | | | | |
|---|---|---|---|---|
| 5,238,156 | A * | 8/1993 | Andris | B05B 11/1077<br>222/207 |
| 5,351,862 | A * | 10/1994 | Weag | B05B 11/028<br>222/327 |
| 5,363,993 | A * | 11/1994 | Mascitelli | B05B 11/1074<br>222/321.9 |
| 5,673,824 | A * | 10/1997 | Evans | B05B 11/1077<br>222/321.9 |
| 6,193,112 | B1 * | 2/2001 | Santagiuliana | B05B 11/1074<br>222/321.9 |
| 6,672,486 | B2 * | 1/2004 | Santagiuliana | B05B 11/1077<br>222/207 |
| 6,755,327 | B1 * | 6/2004 | Hazard | B05B 11/1059<br>222/321.7 |
| 7,111,761 | B2 * | 9/2006 | Masuda | B05B 11/007<br>222/387 |
| 7,246,723 | B2 * | 7/2007 | Santagiuliana | B05B 11/1059<br>222/207 |
| 7,357,278 | B2 * | 4/2008 | Mira Navarro | B05B 11/1077<br>222/153.04 |
| 9,539,597 | B2 * | 1/2017 | Ding | B05B 11/0027 |
| 10,357,792 | B2 * | 7/2019 | Schroeder | B05B 11/1069 |
| 10,421,596 | B2 * | 9/2019 | Koptis | B05C 17/00583 |
| 11,773,840 | B2 * | 10/2023 | Ki | B05B 11/1077<br>417/472 |
| 11,833,533 | B2 * | 12/2023 | Lee | B05B 11/1001 |
| 12,030,070 | B2 * | 7/2024 | Santagiuliana | B05B 11/1074 |
| 12,121,918 | B2 * | 10/2024 | Zembrod | B05B 11/1067 |
| 12,173,768 | B2 * | 12/2024 | Ki | F16F 1/373 |
| 2007/0241135 | A1 * | 10/2007 | Santagiuliana | B05B 11/1008<br>222/321.9 |
| 2009/0206109 | A1 * | 8/2009 | Santagiuliana | B05B 11/1053<br>222/145.6 |
| 2012/0091229 | A1 | 4/2012 | Laidler et al. | |
| 2015/0136810 | A1 | 5/2015 | Ding | |
| 2017/0326567 | A1 * | 11/2017 | Santagiuliana | B05B 11/1001 |
| 2020/0130002 | A1 * | 4/2020 | Baumann | B05B 11/0044 |
| 2022/0331824 | A1 * | 10/2022 | Andrew | F16F 9/0418 |
| 2023/0034207 | A1 * | 2/2023 | Zandona | B05B 11/1035 |
| 2023/0074980 | A1 * | 3/2023 | Zembrod | F04B 45/02 |
| 2023/0204085 | A1 * | 6/2023 | Ki | F16F 1/3605 |
| 2024/0066539 | A1 * | 2/2024 | Choe | B05B 11/1023 |
| 2024/0084790 | A1 * | 3/2024 | Byeon | F04B 9/14 |
| 2025/0035098 | A1 * | 1/2025 | Hang | B05B 11/1077 |

FOREIGN PATENT DOCUMENTS

| | | | |
|---|---|---|---|
| KR | 10-1975847 | B1 | 5/2019 |
| WO | 2009/141510 | A1 | 11/2009 |
| WO | 2017/051086 | A1 | 3/2017 |

* cited by examiner

PUMP CAP

CROSS-REFERENCE TO RELATED APPLICATIONS

This application is a National Phase Application of PCT International Application No. PCT/KR2020/015949, which was filed on Nov. 13, 2020, and which claims priority from Korean Patent Application No. 10-2020-0042160 filed on Apr. 7, 2020. The disclosures of the above patent applications are incorporated herein by reference in their entirety.

BACKGROUND

1. Technical Field

The present invention relates to a pump cap that has a simple composition and allows easy recycling.

2. Description of the Related Art

In the context of a cosmetic container, etc., a pump cap may be coupled to the upper opening of a container holding a liquid, such as a cosmetic liquid, so as to dispense a fixed amount of the content to the exterior. A user who wishes to dispense a liquid content may press down on a nozzle corresponding to a button, upon which the content that was drawn into the pump cap may be pressurized, moved up along the discharge path, and subsequently dispensed through the nozzle. When the user removes the pressure on the nozzle, the discharge path may be mechanically closed by the rising of the nozzle, causing a decrease in pressure inside the pump, and the content may be drawn from the container to compensate.

Such a pump cap is being used for dispensing a variety of contents, including not only perfumes and cosmetics but also shampoos, air fresheners, insecticides, and others. In particular, the pump is growing in demand due to its convenient use, as a fixed amount of content can be dispensed by a single pressing of the nozzle, and the content is prevented from leaking to the outside.

Korean Registered Patent No. 1963619 discloses a pump cap for a spray pump. The pump cap disclosed in the above prior art document includes a nozzle, nozzle cap, cap cover, cap, valve, valve spring, housing cover, piston spring, piston, guide, disk, housing, and others, resulting in a complicated composition that is difficult to manufacture. Also, the conventional pump cap includes a valve spring and a piston spring that are made from a metallic material, which is different from the other components and hence makes recycling difficult. In particular, the increase in awareness and need for protecting the environment in recent times have led to a growing demand for a pump cap that is easy to recycle, but the conventional pump cap is as yet unable to satisfy such demand.

SUMMARY OF THE INVENTION

An aspect of the present invention, which was conceived to resolve the problem described above, is to provide a pump cap that has a simple composition and is easy to recycle.

Other objectives of the present invention will be more clearly understood from the embodiments set forth below.

Technical Solution

One aspect of the invention provides a pump cap that includes: a cylinder having an interior space into which a content may be drawn; a piston configured to move up and down within the interior space and having an inflow hole formed therein that connects to the interior space; a valve configured to move together with the upward and downward movement of the piston, while maintaining contact with an inner perimeter of the cylinder and an outer perimeter of the piston, so as to be capable of closing the inflow hole; a rod that is coupled to an upper portion of the piston, has an inside connecting with the inside of the piston, and protrudes to the outside of the cylinder; a shoulder coupled to an upper portion of the cylinder; and an elastic member that has one end contacting the shoulder and another end contacting the rod and is configured to provide an elastic force for pushing the rod upward, where the elastic member may include a deformable flexible portion.

A pump cap according to an embodiment of the present invention can include one or more of the following features. For example, rigid portions can be formed on both ends of the flexible portion.

An upper end of the flexible portion can be formed as an integrated part of the rod, and a rigid portion can be formed on a lower end of the flexible portion. The flexible portion can include a portion that is shaped as a corrugated tube. The portion shaped as a corrugated tube can be formed over the entire length of the flexible portion.

A coupling groove can be formed in an outer perimeter of the piston, and a coupling protrusion configured to be inserted in the coupling groove can be formed on the inner perimeter of the rod.

Advantageous Effects

An embodiment of the present invention having the features above can provide various advantageous effects including the following. However, an embodiment of the present invention may not necessarily exhibit all of the effects below.

An embodiment of the present invention can provide a pump cap that has a simple composition and is easy to recycle.

DETAILED DESCRIPTION OF THE INVENTION

Figure 1:
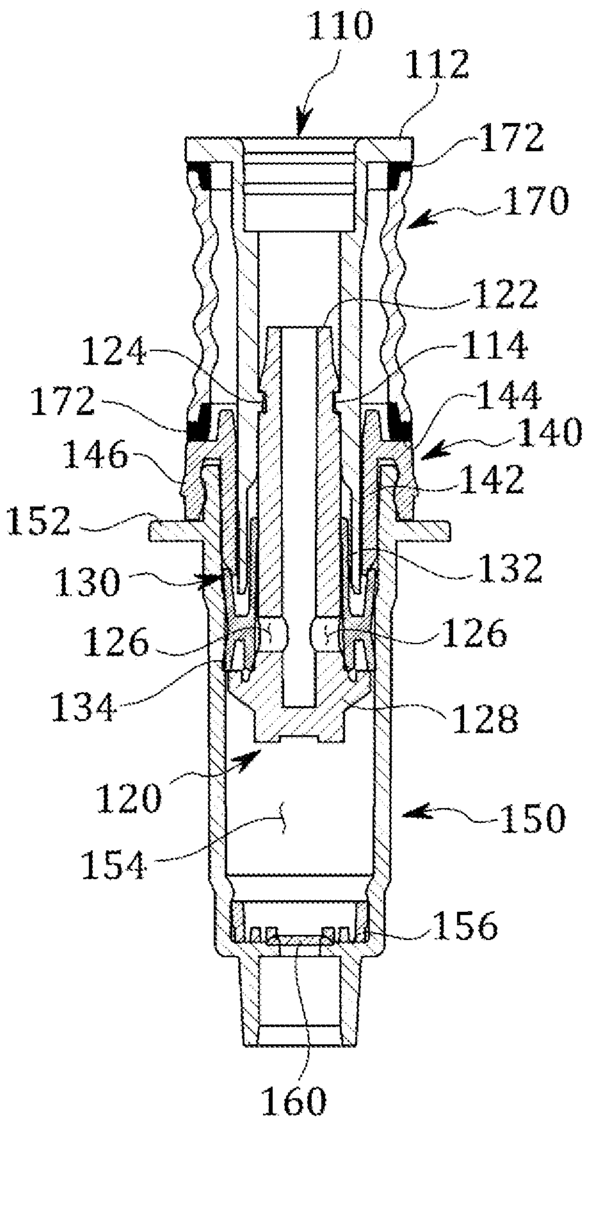
FIG. 1 is a cross-sectional view illustrating a pump cap according to a first disclosed embodiment of the invention.

As the invention allows for various changes and numerous embodiments, particular embodiments will be illustrated in the drawings and described in detail in the written description. However, this is not intended to limit the present invention to particular modes of practice, and it is to be appreciated that all changes, equivalents, and substitutes that do not depart from the spirit and technical scope of the present invention are encompassed by the present invention. In the description of the present invention, certain detailed explanations of the related art are omitted if it is deemed that they may unnecessarily obscure the essence of the invention.

The terms used in the present specification are merely used to describe particular embodiments and are not intended to limit the present invention. An expression used in the singular encompasses the expression of the plural, unless it has a clearly different meaning in the context. In the present specification, it is to be understood that terms such as “including” or “having,” etc., are intended to indicate the existence of the features, numbers, steps, actions, components, parts, or combinations thereof disclosed in the specification and are not intended to preclude the possibility that one or more other features, numbers, steps, actions, components, parts, or combinations thereof may exist or may be added.

While such terms as “first” and “second,” etc., can be used to describe various components, such components are not to be limited by the above terms. The above terms are used only to distinguish one component from another.

Certain embodiments of the present invention will be described below in more detail with reference to the accompanying drawings. Those components that are the same or are in correspondence are rendered the same reference numeral, and redundant descriptions are omitted.

Figure 2:
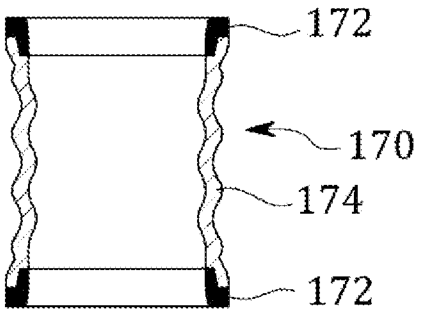
FIG. 2 is a cross-sectional view illustrating the elastic member applied to the pump cap illustrated in FIG. 1.

FIG. 1 is a cross-sectional view illustrating a pump cap 100 according to a first disclosed embodiment of the invention, and FIG. 2 is a cross-sectional view illustrating the elastic member 170 applied to the pump cap 100 illustrated in FIG. 1.

Referring to FIG. 1 and FIG. 2, a pump cap 100 according to this embodiment may use an elastic member 170 fabricated from a plastic resin or silicone, etc., instead of the conventional coil spring that is fabricated from a metallic material. The elastic member 170 may have the shape of a corrugated tube, so that when an external force is applied, the elastic member 170 may be elastically compressed due to the contracting of the corrugations, and when the external force is removed, the elastic member 170 may be elastically restored and provide an upward pressure on the rod 110 and piston 120. Forming the elastic member 170 from the same material as that of other parts of the pump cap 100 in this manner can enable easy recycling.

A pump cap 100 based on the first disclosed embodiment may include a rod 110, a piston 120, a valve 130, a shoulder 140, a cylinder 150, a disk 160, and an elastic member 170 and thus can have a simpler composition compared to the conventional pump cap, to therefore provide the advantages of easier fabrication and lowered manufacturing cost.

The rod 110 may be structured to have the shape of a hollow cylinder with a rod flange 112 protruding outward from an upper end thereof. A lower surface of the rod flange 112 may contact the elastic member 170. The top and bottom of the rod 110 may both be open. The button of a pump (not shown) may be coupled to the top of the rod 110, while a portion of the valve 130 and the piston 120 may be inserted into the bottom of the rod 110.

A coupling protrusion 114 may be formed on the inner perimeter of the rod 110. The coupling protrusion 114 may be inserted into a coupling groove 124 formed in the periphery of the piston 120, which is inserted within the rod 110, so that the rod 110 and the piston 120 may move up or down together as an integrated body.

The piston 120 may include a piston body 122 that is inserted into the rod 110. The piston body 122 may be shaped as a hollow cylinder, where the upper end of the piston body 122 may be open to allow a connection with the interior of the rod 110. Inflow holes 126 may be formed in the periphery of the piston body 122. The valve 130 may be placed in tight contact around the inflow holes 126 so as to close the inflow holes 126.

A piston head 128 may be formed at the lower end of the piston body 122. The piston head 128 may be formed with a larger diameter than that of the piston body 122, so that when the piston 120 moves upward, the valve 130 may be caught on the piston head 128 and be moved upward together.

The valve 130 may be placed in tight contact on the outer perimeter of the piston body 122. The valve 130 may include a piston-contacting portion 132 and a cylinder-contacting portion 134.

The valve 130 may include a piston-contacting portion 132 and a cylinder-contacting portion 134.

The piston-contacting portion 132 may tightly contact the outer perimeter of the piston body 122 and may have the shape of a hollow cylinder. The piston-contacting portion 132 may close the inflow holes 126, but when the piston 120 is moved downward, the piston-contacting portion 132 may move down after a delay following the piston 120 so as to leave the inflow holes 126 open for a certain duration of time. The upper portion of the piston-contacting portion 132 may be inserted within a gap formed between the rod 110 and the piston 120.

The cylinder-contacting portion 134 may have a larger diameter than that of the piston-contacting portion 132 and may be positioned around the piston-contacting portion 132. The cylinder-contacting portion 134 may also have the shape of a hollow cylinder, and the outer perimeter of the cylinder-contacting portion 134 may tightly contact the inner perimeter of the cylinder 150. Due to the cylinder-contacting portion 134, the valve 130 may be delayed from moving downward when the piston 120 is moved down.

Thus, the valve 130 may be delayed in its downward movement, due to the friction with the inner perimeter of the cylinder 150, when the piston 120 moves downward. As a result, the inflow holes 126 of the piston 120 may be opened, and the content (not shown) that had been drawn into the interior space 154 may be drawn into the inside of the piston 120. When the piston 120 moves upward, the valve 130 may be caught on the piston head 128 and may move up together with the piston 120.

The shoulder 140 may include a shoulder body 142 that is inserted into the open top of the cylinder 150. The shoulder body 142 may have the shape of a hollow cylinder and may receive the rod 110 inserted therein. A shoulder flange 144 may protrude outward from a periphery of the shoulder body 142. The upper surface of the shoulder flange 144 may contact the lower end of the elastic member 170. Also, a shoulder periphery part 146 may be formed protruding downward from the end of the shoulder flange 144. The shoulder periphery part 146 may contact the outer perimeter of an upper portion of the, and the lower end of the shoulder periphery part 146 may contact an upper surface of the cylinder flange 152.

The cylinder 150 may be inserted into the opening in an upper portion of the container (not shown) in which the content is held. The cylinder 150 may include an interior space 154 into which the content may be drawn, where the piston 120 and the valve 130 may be located in and may undergo upward and downward movement within the interior space 154.

The cylinder 150 may have the shape of a hollow cylinder and may be structured such that the top and the bottom are both open. A cylinder flange 152 may protrude outward from a periphery of the cylinder 150. The cylinder flange 152 can be mounted on the upper portion of the container (not shown).

On the inside of the cylinder 150, a mounting curb 156 having a reduced diameter may be formed. The disk 160 can be positioned on the mounting curb 156. The disk 160 can be configured to open or close depending on the pressure difference between the interior space 154 and the container. A description of the structure of the disk 160 is not provided here, as it is readily available in documents such as Korean Registered Patent No. 1975847.

The elastic member 170, while positioned between the rod flange 112 and the shoulder flange 144, may serve to push the rod 110 upward. When an external force is applied, the elastic member 170 may be elastically deformed, as the flexible portion 174 is compressed.

The elastic member 170 may include a flexible portion 174, which is capable of elastic deformation, and rigid portions 172, each of which may be formed on either end of the flexible portion 174. The flexible portion 174 and the rigid portions 172 can be formed as an integrated body by way of double-shot molding. Also, the flexible portion 174 and the rigid portions 172 can be formed from a material such as plastic resin, etc., that is the same as the material used for other parts of the pump cap 100.

The rigid portion 172 located at the lower end of the elastic member 170 may be positioned on the upper surface of the shoulder flange 144. The rigid portion 172 located at the upper end of the elastic member 170 may be positioned at the lower surface of the rod flange 112. The rigid portions 172 may be formed by a material having a certain level of hardness, so as to support both ends of the elastic member 170 in a stable manner.

The flexible portion 174 may be shaped as a corrugated tube that is capable of being compressed. The flexible portion 174 may have the shape of a hollow cylinder, and a portion of the rod 110 may be positioned on the inside of the flexible portion 174.

Figure 3:
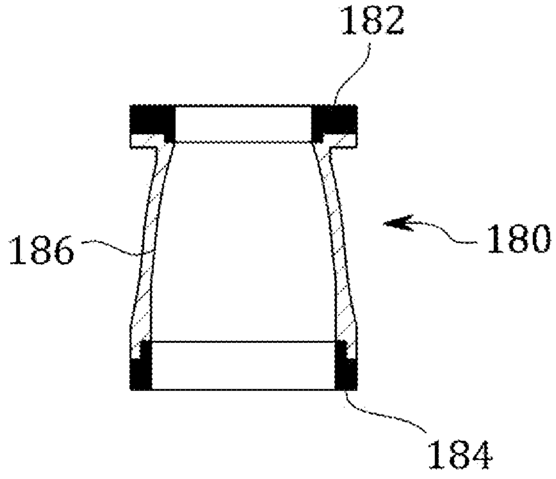
FIG. 3 and FIG. 4 are cross-sectional views each illustrating an elastic member according to another embodiment of the invention.
Figure 4:
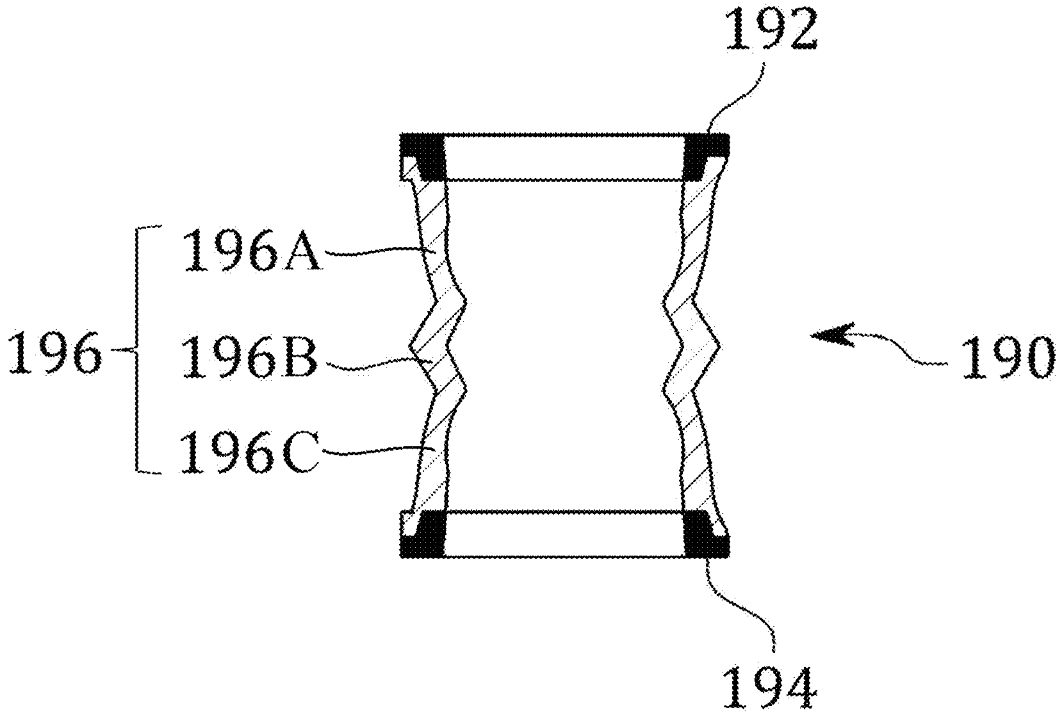

Although an example of an elastic member 170 according to the first disclosed embodiment is illustrated with the flexible portion 174 having the same diameter along its height and having the shape of a corrugated tube over its entire length, an embodiment of the invention can include an elastic member 180, 190 having any of a variety of shapes, as is illustrated in FIG. 3 and FIG. 4.

FIG. 3 and FIG. 4 are cross-sectional views each illustrating an elastic member 180, 190 according to another embodiment of the invention.

Referring to FIG. 3, an elastic member 180 can include two rigid portions 182, 184 that are shaped differently. Also, the flexible portion 186, which is capable of being compressed and providing an elastic force, can have a smooth shape instead of being shaped as a corrugated tube. When pressed, a flexible portion 186 shaped in this manner can be elastically deformed as a portion thereof is folded.

Referring to FIG. 4, an elastic member 190 can include two rigid portions 192, 194 that are shaped alike. Also, a flexible portion 196 that is capable of being compressed and providing an elastic force may be formed between the rigid portions 192, 194. The flexible portion 196 may have a corrugation in only a portion at the center, rather than having corrugations along its entire length. The flexible portion 196 includes an upper non-corrugated tube 196A, a lower non-corrugated tube 196C, and a center corrugated tube 196B provided between the upper and lower non-corrugated tubes 196A and 196C.

Thus, embodiments of the invention can include elastic members having various shapes and structures.

Figure 5:
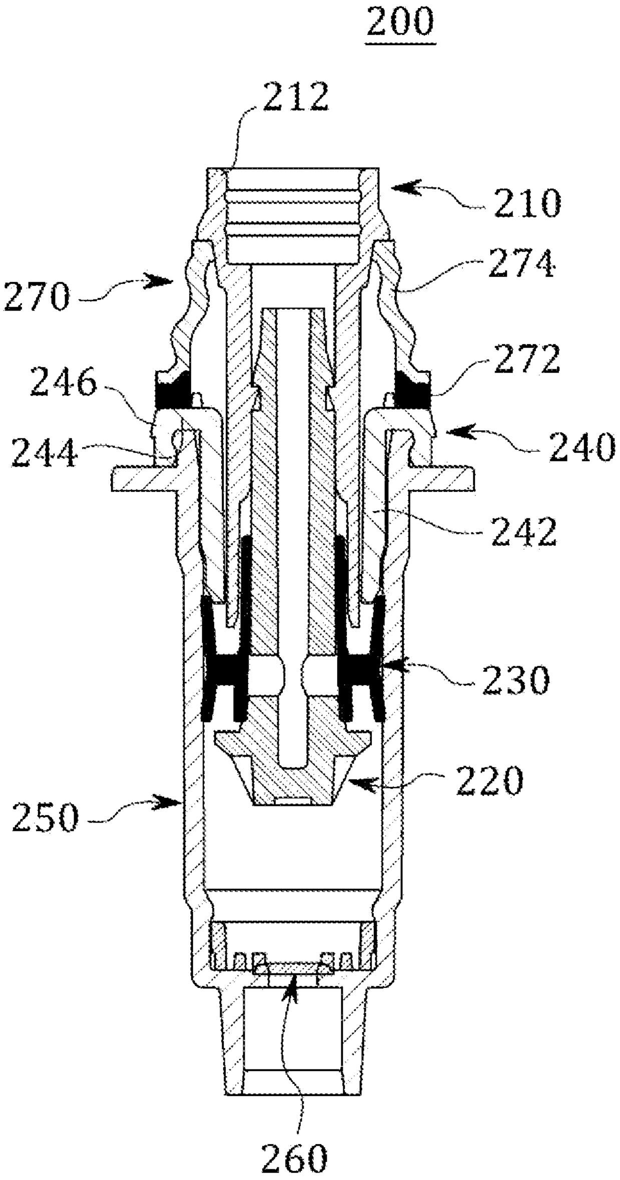
FIG. 5 is a cross-sectional view illustrating a pump cap according to a second disclosed embodiment of the invention.
Figure 6:
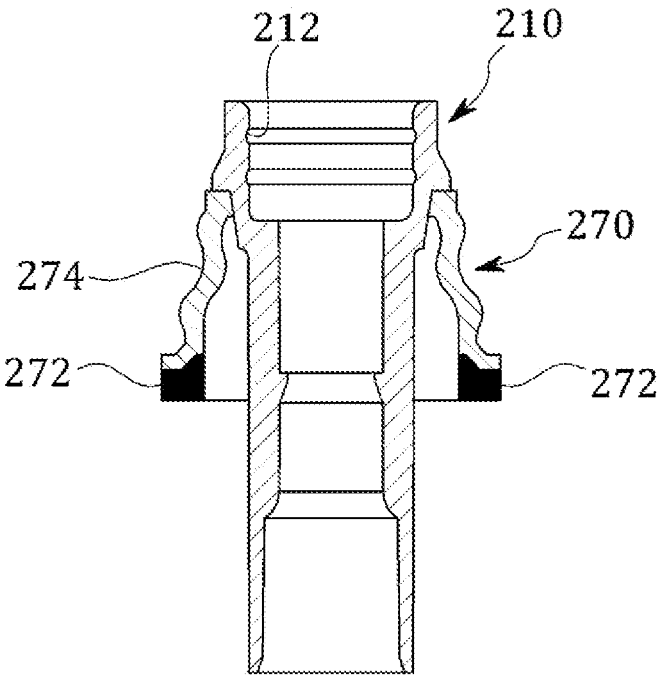
FIG. 6 is a cross-sectional view illustrating the elastic member and rod applied to the pump cap illustrated in FIG. 5.

FIG. 5 is a cross-sectional view illustrating a pump cap 200 according to a second disclosed embodiment of the invention, and FIG. 6 is a cross-sectional view illustrating the elastic member 270 and rod 210 applied to the pump cap 200 illustrated in FIG. 5.

Referring to FIG. 5 and FIG. 6, a pump cap 200 based on the second disclosed embodiment may have the same or similar components as those of a pump cap 100 based on the first disclosed embodiment, and as such, the following descriptions will focus mainly on the differences.

A pump cap 200 according to the second embodiment may include a rod 210, a piston 220, a valve 230, a shoulder 240, a cylinder 250, a disk 260, and an elastic member 270. Among these, the piston 220, valve 230, cylinder 250, and disk 260 may be substantially the same as their counterparts in a pump cap 100 according to the first disclosed embodiment and thus will not be described here in detail.

The rod 210 may be substantially the same as the rod 110 in the first disclosed embodiment, but with differences in the shape of the rod head 212 and the fact that the upper end of the flexible portion 274 may be formed as an integrated part on the periphery of the rod head 212.

The shoulder 240 may also be substantially the same as the shoulder 140 in the first disclosed embodiment, but with the difference that the shoulder flange 244 formed on the periphery of the shoulder body 242 may be formed on the upper end. The shoulder periphery part 246 may also be substantially the same as the shoulder periphery part 146 of the first disclosed embodiment.

An elastic member 270 based on the second disclosed embodiment may not have a rigid portion formed on the upper end of the flexible portion 274 but rather may be formed as an integrated body with the rod head 212. Also, the flexible portion 274 may be shaped as a corrugated tube has a decreasing diameter from the bottom upward. A rigid portion 272 that is harder and less easily deformed than the flexible portion 274 may be formed at the lower end of the flexible portion 274. The rigid portion 272 may be positioned on the upper surface of the shoulder flange 244.

While the foregoing provides a description with reference to an embodiment of the present invention, it should be appreciated that a person having ordinary skill in the relevant field of art would be able to make various modifications and alterations to the present invention without departing from the spirit and scope of the present invention set forth in the scope of claims below.

What is claimed is:

1. A pump cap comprising:
- a cylinder having an interior space configured to receive a content drawn thereinto;
- a piston configured to move up and down within the interior space and having an inflow hole formed therein, the inflow hole connecting to the interior space;
- a valve configured to move together with an upward and downward movement of the piston while maintaining contact with an inner perimeter of the cylinder and an outer perimeter of the piston, the valve capable of closing the inflow hole;
- a rod coupled to an upper portion of the piston and having an inside thereof connecting with an inside of the piston, the rod protruding to an outside of the cylinder;
- a shoulder coupled to an upper portion of the cylinder; and
- an elastic member having one end thereof contacting the shoulder and another end thereof contacting the rod, the elastic member configured to provide an elastic force for pushing the rod upward, wherein the elastic member comprises a flexible portion, wherein the flexible portion comprises:

an upper non-corrugated tube;

a lower non-corrugated tube; and a center corrugated tube provided between the upper and lower non-corrugated tubes, wherein an outer diameter of an upper end of the upper non-corrugated tube is greater than an outer diameter of a lower end of the upper non-corrugated tube, wherein an outer diameter of an upper end of the lower non-corrugated tube is less than an outer diameter of a lower end of the lower non-corrugated tube, wherein a length of the center corrugated tube is less than lengths of the upper and lower non-corrugated tubes, respectively.

2. The pump cap of claim 1, wherein rigid portions are formed on both ends of the flexible portion.

3. The pump cap of claim 1, wherein an upper end of the flexible portion is formed as an integrated part of the rod, and a rigid portion is formed on a lower end of the flexible portion.

4. The pump cap of claim 1, wherein a coupling groove is formed in an outer perimeter of the piston, and a coupling protrusion configured to be inserted in the coupling groove is formed on an inner perimeter of the rod.

* * * * *